United States Patent
Batdorf et al.

(10) Patent No.: US 8,540,260 B1
(45) Date of Patent: Sep. 24, 2013

(54) SHAFT SUPPORT ASSEMBLIES HAVING CROSS MEMBER ASSEMBLY FOR TRANSMITTING TORQUE THROUGH VARIOUS AXES AND VEHICLE INCLUDING SAME

(75) Inventors: Scott Daniel Batdorf, Raymond, OH (US); Daniel Thomas Sellars, West Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/550,765

(22) Filed: Jul. 17, 2012

(51) Int. Cl.
*B60G 9/02* (2006.01)

(52) U.S. Cl.
USPC ........ 280/124.111; 280/124.11; 280/124.114; 280/124.156; 180/358

(58) Field of Classification Search
USPC ....... 280/124.11, 124.111, 124.114, 124.156; 180/358
See application file for complete search history.

(56) References Cited

U.S. PATENT DOCUMENTS

| | | | |
|---|---|---|---|
| 1,271,615 A | | 7/1918 | Ranger |
| 2,105,369 A | * | 1/1938 | Paton .......................... 180/358 |
| 2,612,231 A | * | 9/1952 | Bretschneider .............. 180/358 |
| 2,784,794 A | * | 3/1957 | Barenyi .......................... 180/57 |
| 3,045,774 A | * | 7/1962 | Hadlock ....................... 180/235 |
| 3,099,460 A | * | 7/1963 | Sheehan ....................... 280/676 |
| 3,273,912 A | * | 9/1966 | Crockett ....................... 280/104 |
| 3,466,058 A | * | 9/1969 | King ........................ 280/124.11 |
| 4,877,102 A | | 10/1989 | Stewart |
| 5,195,605 A | * | 3/1993 | Wood ............................ 180/254 |
| 5,447,321 A | * | 9/1995 | Hurlburt et al. .......... 280/93.504 |
| 5,845,918 A | | 12/1998 | Grinde et al. |
| 5,954,586 A | | 9/1999 | Kirson |
| 6,056,304 A | * | 5/2000 | Brambilla ............... 280/124.111 |
| 6,383,081 B1 | | 5/2002 | DeBisschop |
| 6,491,126 B1 | * | 12/2002 | Robison et al. ............... 180/233 |
| 6,675,926 B2 | * | 1/2004 | Montague .................... 180/350 |
| 6,695,328 B2 | * | 2/2004 | Cope ..................... 280/124.111 |
| 6,758,623 B2 | * | 7/2004 | Bushey ........................... 403/57 |
| 6,883,630 B2 | | 4/2005 | Morin |
| 7,125,027 B2 | * | 10/2006 | Sap et al. ............... 280/124.114 |
| 7,144,326 B2 | * | 12/2006 | Thompson .................... 464/112 |
| 7,442,126 B2 | * | 10/2008 | Thompson .................... 464/112 |
| 7,841,923 B2 | * | 11/2010 | Marzetta et al. ............. 446/466 |
| 2009/0197687 A1 | | 8/2009 | Ando et al. |
| 2009/0218781 A1 | | 9/2009 | Sellars et al. |
| 2011/0315468 A1 | * | 12/2011 | Sellars et al. ................. 180/350 |

* cited by examiner

*Primary Examiner* — Nicole Verley
(74) *Attorney, Agent, or Firm* — Ulmer & Berne LLP

(57) ABSTRACT

A vehicular swing arm assembly includes a swing member, an axle support assembly, and an axle. The swing member is configured for pivotal attachment to a frame of a vehicle. The axle support assembly includes a driven member and a cross member assembly. The driven member is rotatably coupled with the swing member and is rotatable about a drive axis. The cross member assembly includes a first pivot member and a second pivot member. The first pivot member is pivotally coupled with the driven member and is pivotable with respect to the driven member. The second pivot member is pivotally coupled with the first pivot member and is pivotable with respect to the first pivot member. The axle is coupled with one of the first and second pivot members and is rotatable. Rotation of the driven member about the drive axis facilitates rotation of the axle.

20 Claims, 12 Drawing Sheets

SHAFT SUPPORT ASSEMBLIES HAVING CROSS MEMBER ASSEMBLY FOR TRANSMITTING TORQUE THROUGH VARIOUS AXES AND VEHICLE INCLUDING SAME

TECHNICAL FIELD

A shaft support assembly includes a cross member assembly that supports a shaft.

BACKGROUND

A conventional vehicle includes a rear swing arm assembly which supports a rear axle. When severe terrain is encountered, the rear swing arm assembly allows the rear axle to move with respect to the vehicle's frame. However, conventional swing arm assemblies often do not facilitate effective pivoting of the rear axle.

SUMMARY

In accordance with one embodiment, a vehicular swing arm assembly comprises a swing member, an axle support assembly, and an axle. The swing member is configured for pivotal attachment to a frame of a vehicle. The axle support assembly comprises a driven member and a cross member assembly. The driven member is rotatably coupled with the swing member and is rotatable about a drive axis. The cross member assembly comprises a first pivot member and a second pivot member. The first pivot member is pivotally coupled with the driven member and is pivotable with respect to the driven member about a first axis. The second pivot member is pivotally coupled with the first pivot member and is pivotable with respect to the first pivot member about a second axis. The axle is coupled with one of the first and second pivot members and is rotatable about a third axis. Rotation of the driven member about the drive axis facilitates rotation of the axle about the third axis.

In accordance with another embodiment, a vehicle comprises a frame, a swing member, an axle support assembly, and an axle. The swing member is pivotally attached to the frame. The axle support assembly comprises a driven member and a cross member assembly. The driven member is rotatably coupled with the swing member. The cross member assembly comprises a first pivot member and a second pivot member. The first pivot member is pivotally coupled with the driven member and is pivotable with respect to the driven member about a first axis. The second pivot member is pivotally coupled with the first pivot member and is pivotable with respect to the first pivot member about a second axis. The axle is coupled with one of the first and second pivot members and is rotatable about a third axis. Rotation of the housing about the housing axis facilitates rotation of the axle about the third axis.

In accordance with another embodiment, a shaft assembly comprises a shaft and a cross member assembly. The cross member assembly comprises a first pivot member and a second pivot member. The first pivot member is configured for pivoting with respect to a driven member and is pivotable about a first axis. The second pivot member is pivotally coupled with the first pivot member and is pivotable with respect to the first pivot member about a second axis. The shaft is coupled with the second pivot member, and the first pivot member and the second pivot member cooperate to facilitate pivoting of the shaft about a third axis.

BRIEF DESCRIPTION OF THE DRAWINGS

Various embodiments will become better understood with regard to the following description, appended claims, and accompanying drawings wherein:

DETAILED DESCRIPTION

Figure 1:
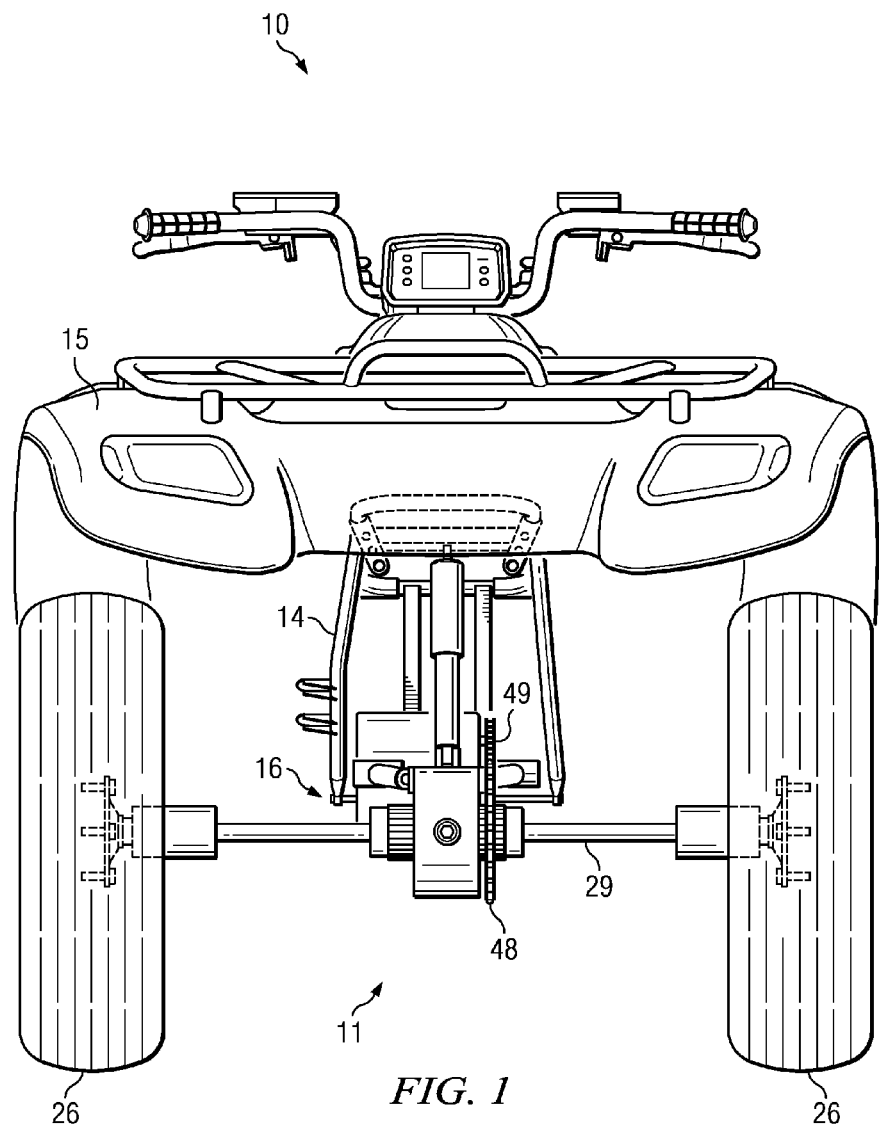
FIG. 1 is a rear elevational view depicting a vehicle in accordance with one embodiment.

The present invention and its operation are hereinafter described in detail in connection with the views and examples of FIGS. 1-14, wherein like numbers indicate the same or corresponding elements throughout the views. A suspension assembly in accordance with one embodiment of the present invention can be provided upon a vehicle 10. The vehicle 10 is shown in FIG. 1 to be an ATV, but in other embodiments, the vehicle 10 can be an automobile, a recreational vehicle, or a utility vehicle, for example. In one embodiment, and as depicted in FIG. 1, a suspension assembly can include a swing arm assembly 11 that is movably attached to a frame 14. In one embodiment, the frame 14 can have a plurality of tubular frame components. However, the frame 14 can be provided in any of a variety of suitable alternative arrangements, such as formed integrally with a vehicular unibody. The frame 14 can support a body 15 which in some embodiments can include a variety of decorative panels.

Figure 2:
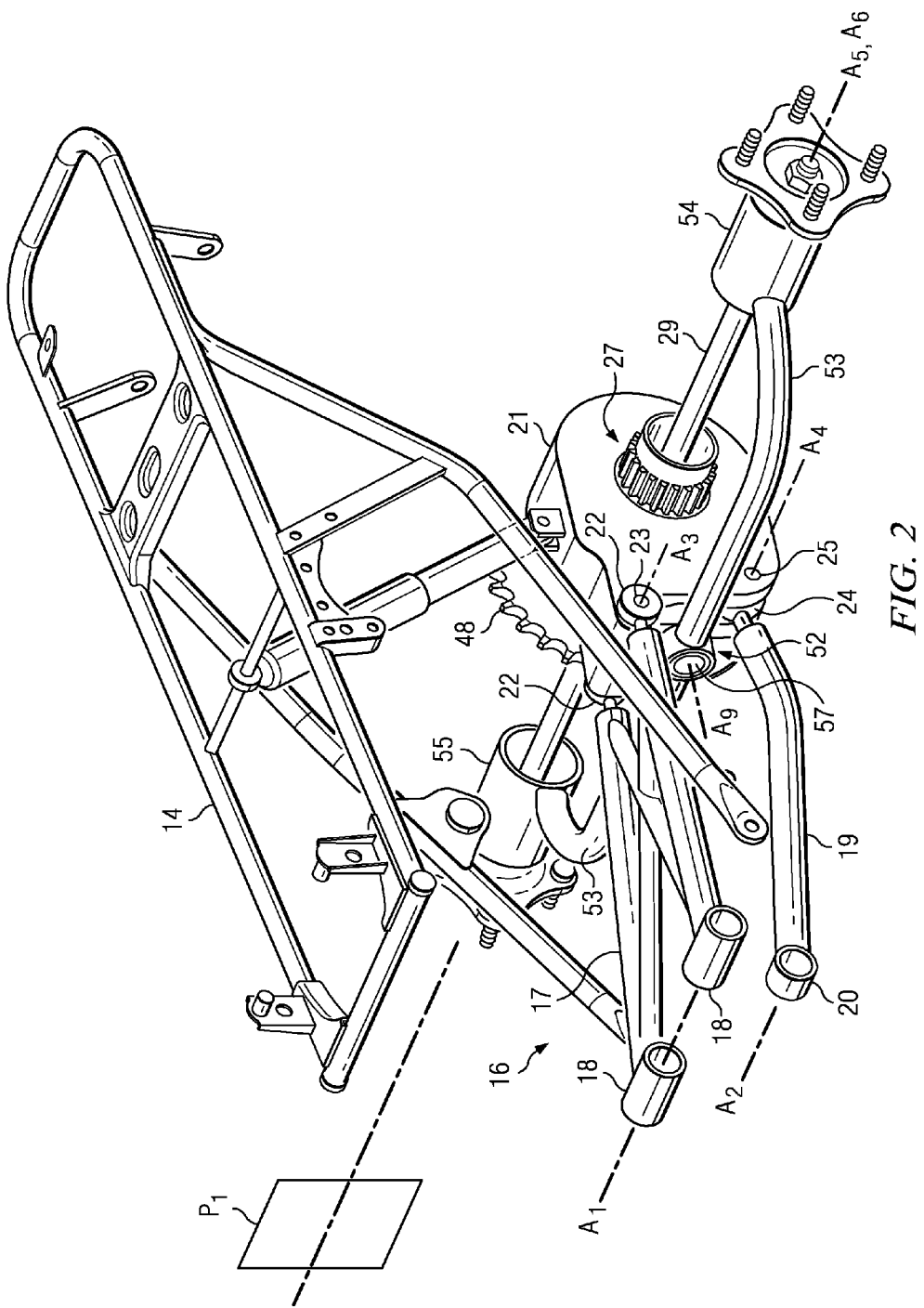
FIG. 2 is an enlarged perspective view depicting a frame, a swing arm assembly, a housing support, and an axle support assembly in connection with various other components of the vehicle of FIG. 1.

The swing arm assembly 11 can include a swing member assembly 16. In one embodiment, as illustrated in FIG. 2, the swing member assembly 16 can include an upper swing member 17, a lower swing member 19, and a housing support 21. The upper swing member 17 can include upper front supports 18 and upper rear supports 22. In one embodiment, the upper front supports 18 and upper rear supports 22 can include cylindrical portions. A pin (not shown) can be provided through the frame 14 and the upper front supports 18 to facilitate pivoting of the upper swing member 17 on the pin and about an axis A1. Another pin (e.g., 23) can be provided through the housing support 21 and the upper rear supports 22 to facilitate pivoting of the upper swing member 17 about an axis A3 with respect to the housing support portion 21.

In such an embodiment, as further illustrated in FIG. 2, the lower swing member 19 can include a lower front support 20 and a lower rear support 24. Similar to the upper front and rear supports 18, 22 of the upper swing member 17, the lower front support 20 and the lower rear support 24 can include cylindrical portions. A pin (not shown) can be provided through the frame 14 and the lower front support 20 to facilitate pivoting of the lower swing member portion 19 about an axis A2 with respect to the frame 14. Likewise, another pin (e.g., 25) can be provided through the housing support portion 21 and the lower rear support 24 to facilitate pivoting of the lower swing member 19 about an axis A4 with respect to the housing support portion 21. The upper and lower swing members 17, 19 can accordingly facilitate vertical movement of the housing support portion 21 with respect to the frame 14. It will be appreciated that supports of a swing member can cooperate with the frame in any variety of alternative mechanical engagements such as might involve one or more spherical joints, rubber bushings, heim joints, saddle joints, or the like.

It will also be appreciated that a swing member assembly can be provided in any of a variety of other suitable configurations. For example, a swing member assembly can include only a single (e.g., upper) swing member which is movably attached to a vehicle's frame. This single swing member can be integrally provided with or fixedly attached to a housing support portion. Such an arrangement might not include any other (e.g., lower) swing members for attaching a housing support portion to the vehicle's frame. As another example, a swing member assembly might include more than two swing members.

As illustrated in FIGS. 2-5, the vehicle 10 can include an axle support assembly 27 that includes a housing 28. The housing 28 can be rotatably coupled with the housing support 21 such that the housing 28 rotates about a housing axis A5 (shown in FIGS. 2-4) with respect to the housing support 21. The housing axis A5 can be substantially parallel with the axes A1, A2, A3, and A4. The housing 28 can support a rear axle 29 which can be coupled with a pair of rear wheels 26 (FIG. 1). Rotation of the housing 28 can rotate the rear axle 29 about a rotation axis A6 (shown in FIG. 2 to be coaxial with housing axis A5) to power the rear wheels 26.

Figure 5:
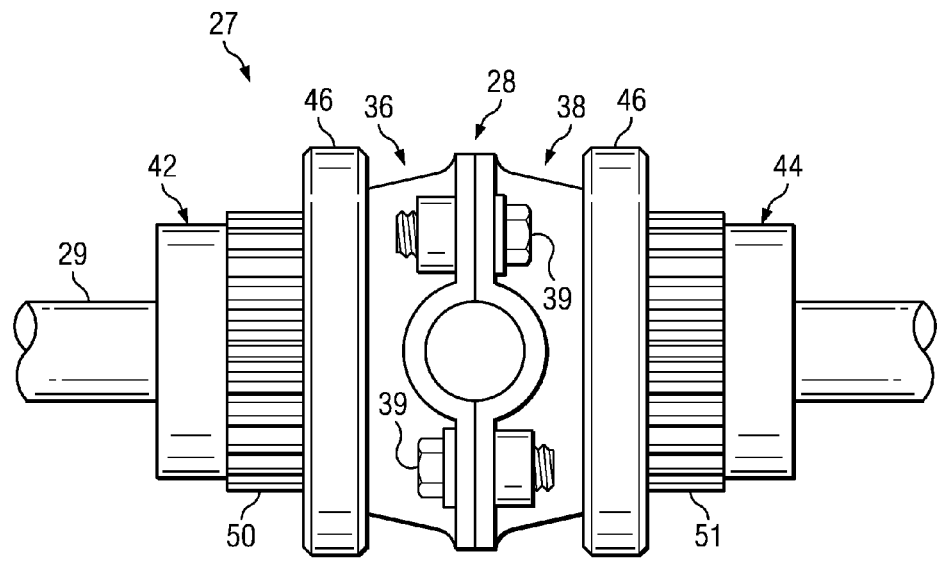
FIG. 5 is an enlarged rear elevational view depicting the axle support assembly of the vehicle of FIG. 1.

In one embodiment, as illustrated in FIG. 5, the housing 28 can include a left housing portion 36 and a right housing portion 38 that can be releasably coupled together with bolts 39, as shown in FIG. 5. The left and right housing portions 36, 38 can include respective left and right neck portions 42, 44. In one embodiment, bearings 46 can be coupled with each of the left and right neck portions 42, 44 such that the housing 28 can be journalled with respect to the housing support 21 by the bearings 46. In other embodiments, however, the housing 28 can be rotatably supported using any variety of alternative rotational arrangements such as frictional engagement using viscous fluid, magnetic levitation, or the like.

Figure 3:
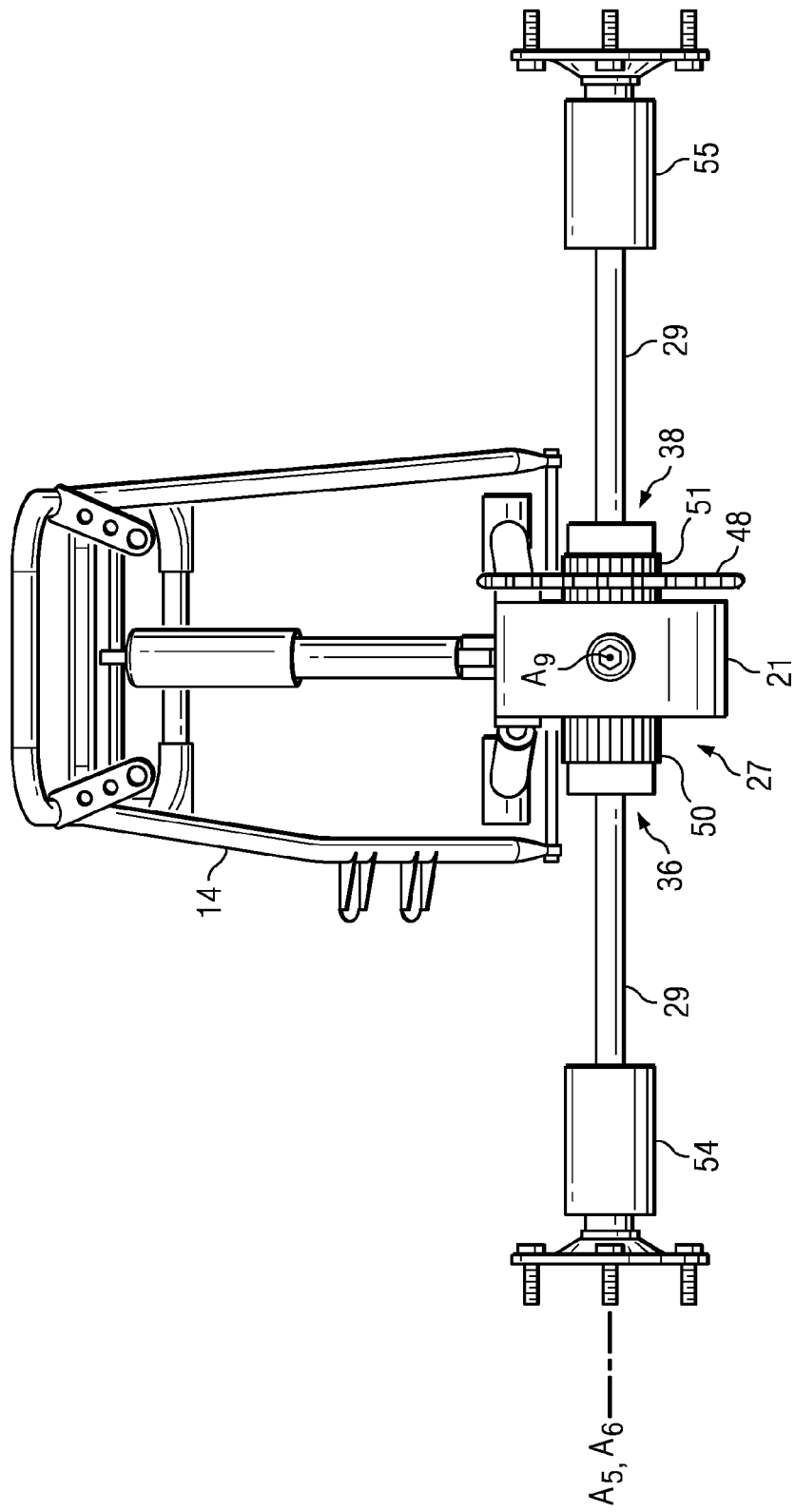
FIG. 3 is a rear elevational view depicting the components of FIG. 2.
Figure 4:
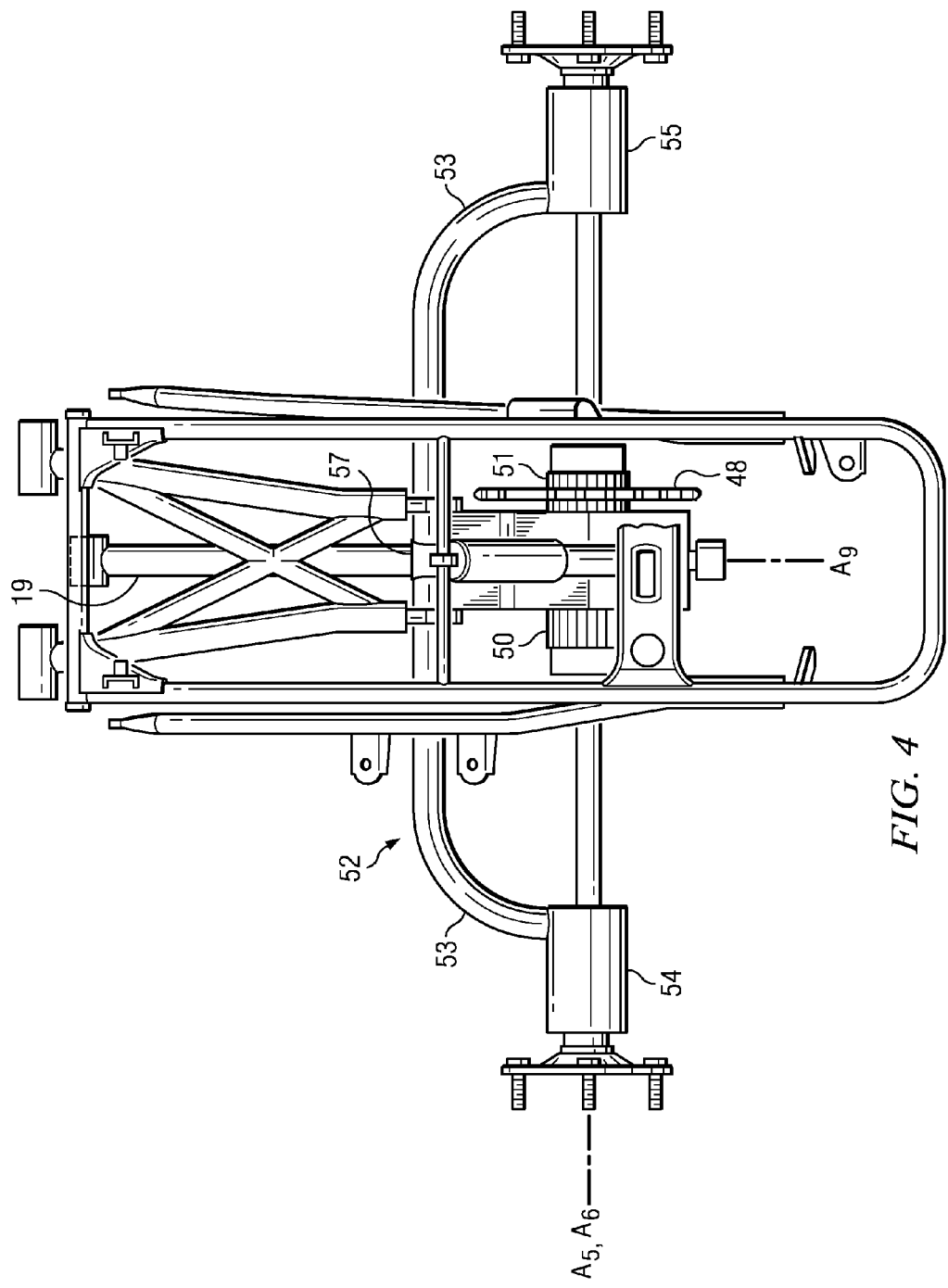
FIG. 4 is a top plan view depicting the components of FIG. 2.
Figure 6:
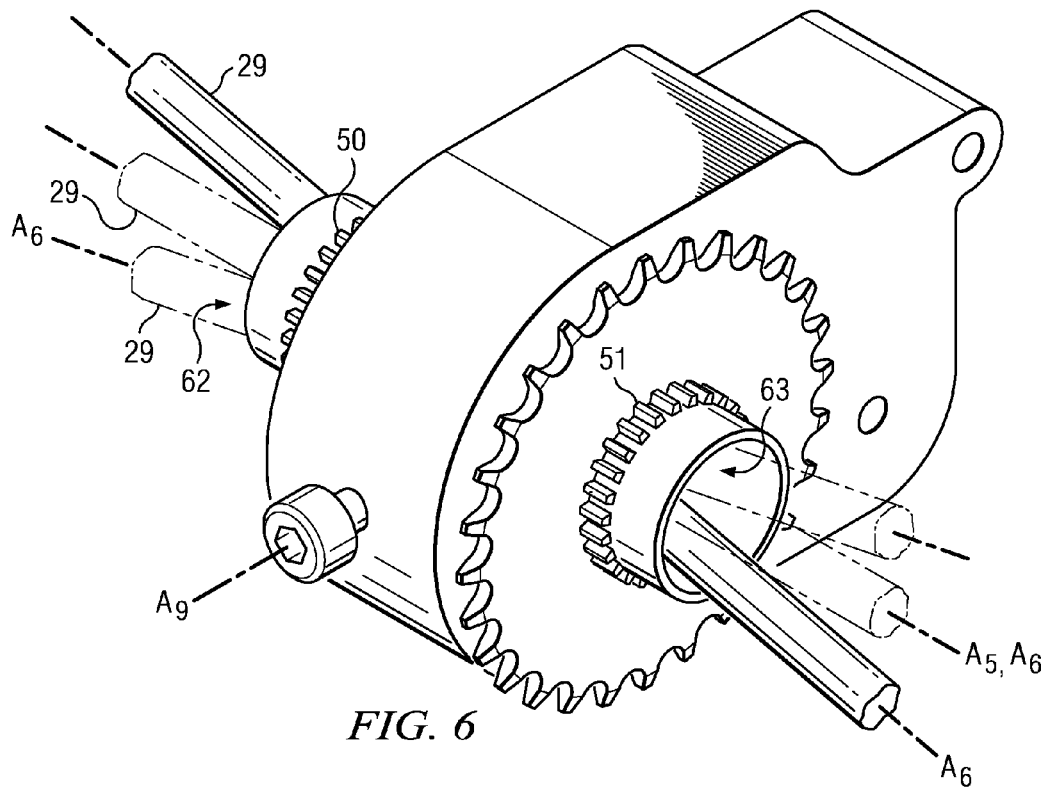
FIG. 6 is an enlarged rear perspective view depicting the housing support of FIG. 2, wherein a rear axle is shown in solid lines in one position and in dashed lines in other positions.

As illustrated in FIGS. 2-4, a driven sprocket 48 can be coupled with the housing 28. A flexible transmitter, such as a chain (e.g., 49 in FIG. 1) or a cogged belt (not shown), can couple the driven sprocket 48 to an engine's driveshaft (not shown). The driveshaft can rotate the driven sprocket 48 via the flexible transmitter to drive the rear wheels 26. In one embodiment, as illustrated in FIGS. 2-5, the driven sprocket 48 can be coupled with the housing 28 through splined engagement. In such an embodiment, as illustrated in FIGS. 5 and 6, the left and right neck portions 42, 44 can include respective left and right splines 50, 51. The driven sprocket 48 is shown to be coupled with the right neck portion 44 through engagement with the right splines 51. In an alternative arrangement, the driven sprocket 48 can be coupled with the left neck portion 42 through engagement with the left splines 50. In another embodiment, in lieu of a driven sprocket, a pulley can be coupled with the housing 28 and selectively driven with the engine's driveshaft by a V-belt. In yet another embodiment, a gear arrangement such as a worm, bevel, or hypoid gear arrangement, for example, can be coupled with one of the left and right neck portions 42, 44 and driven by the engine's driveshaft to rotate the housing 28. It will be appreciated that the housing 28 can be driven, directly or indirectly, by the driveshaft of the vehicle 10 in any of a variety of suitable alternative arrangements.

It will also be appreciated that the left and right neck portions 42, 44 can additionally or alternatively be coupled with a brake disc or brake drum (not shown). In one embodiment, the brake disc or brake drum can be coupled with the housing 28 through splined engagement similar to that described with respect to the driven sprocket 48. The brake disc or brake drum can be associated with a caliper or brake shoe, respectively which can be selectively actuated (e.g., through operation of a brake lever or a brake pedal) to inhibit rotation of the housing 28.

The swing arm assembly 11 can further include a stabilizing assembly 52 as shown in FIGS. 2 and 4, for example. The stabilizing assembly 52 can include a central portion 53, a left support portion 54, and a right support portion 55. The left support portion 54 and the right support portion 55 can be attached to the central portion 53. As illustrated in FIGS. 1-4, the rear axle 29 can extend through each of left and right support portions 54, 55. In one embodiment, the rear axle 29 can be journalled with respect to the left and right support portions 54, 55 by bearings (not shown). However, it will be appreciated that the rear axle 29 can be rotatably supported using any variety of alternative mechanical structures and in any of a variety of alternative rotational arrangements.

The stabilizing assembly 52 can pivot about an axis A9, as illustrated in FIGS. 2 and 6. In one embodiment, as illustrated in FIG. 2, the central portion 53 of the stabilizing assembly 52 can include a knuckle 57. The knuckle 57 can include having a pin member (not shown) that projects into a bushing member (not shown) defined or supported by the housing support portion 21. The stabilizing assembly 52 can thus facilitate pivoting of the rear axle 29 about the axis A9. The axis A9 is shown to be perpendicular to a plane P1 (FIG. 2). When the rear axle 29 pivots about the axis A9, the rear axle 29 can roll with respect to the housing 28 such that the rotation axis A6 of the rear axle 29 is maintained within the plane P1. The rear axle 29 can accordingly be supported by the left and right supports 54, 55 such that when different forces are imparted to each of the rear wheels 26 (e.g., due to uneven terrain or when the vehicle 10 encounters a turn), the stabilizing assembly 52 and the rear axle 29 can pivot together about the axis A9 and the forces imparted to the rear wheels 26 can be distributed throughout the stabilizing assembly 52 to minimize stress on the rear axle 29. Additionally, as described below, the axle support assembly 27 can permit axial and radial forces imparted to the rear wheels 26 to be distributed through the rear axle 29 to the housing support to minimize stress on the stabilizing assembly 52.

Figure 7:
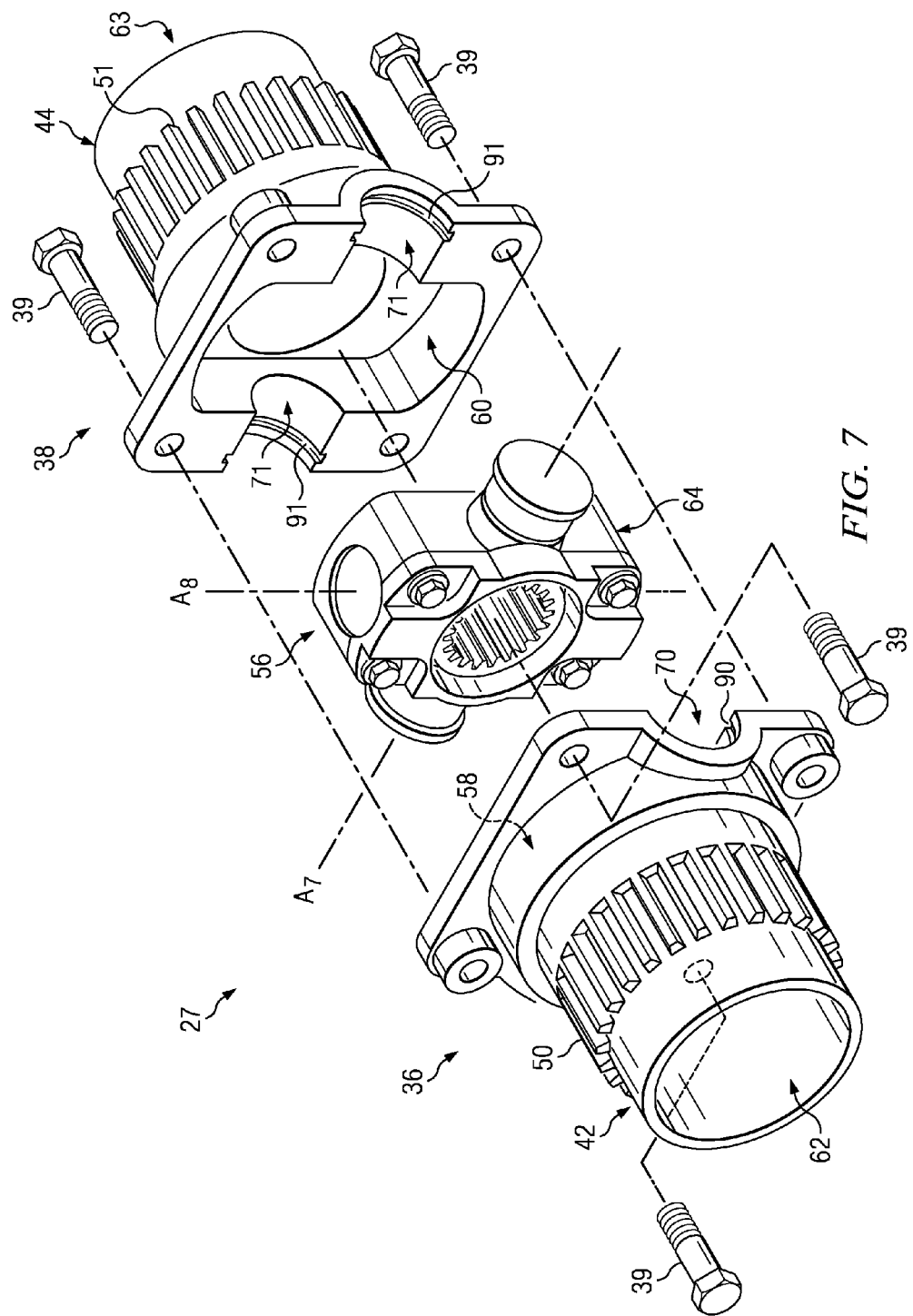
FIG. 7 is an exploded view depicting a left housing portion, a right housing portion, and a cross member assembly in connection with various other components of the axle support assembly of FIG. 5.

The axle support assembly 27 can include a cross member assembly 56, as illustrated in FIG. 7 that can facilitate pivoting of the rear axle 29 with respect to the housing 28 during operation of the vehicle 10. In one embodiment, the left housing portion 36 can define a left receptacle 58 and the right housing portion 38 can define a right receptacle 60. When the left and right housing portions 36, 38 are coupled together (e.g., with bolts 39), the left and right receptacles 58, 60 can cooperate to define an inner chamber. The cross member assembly 56 can be coupled with the housing 28 and at least partially disposed within the inner chamber.

Figure 8:
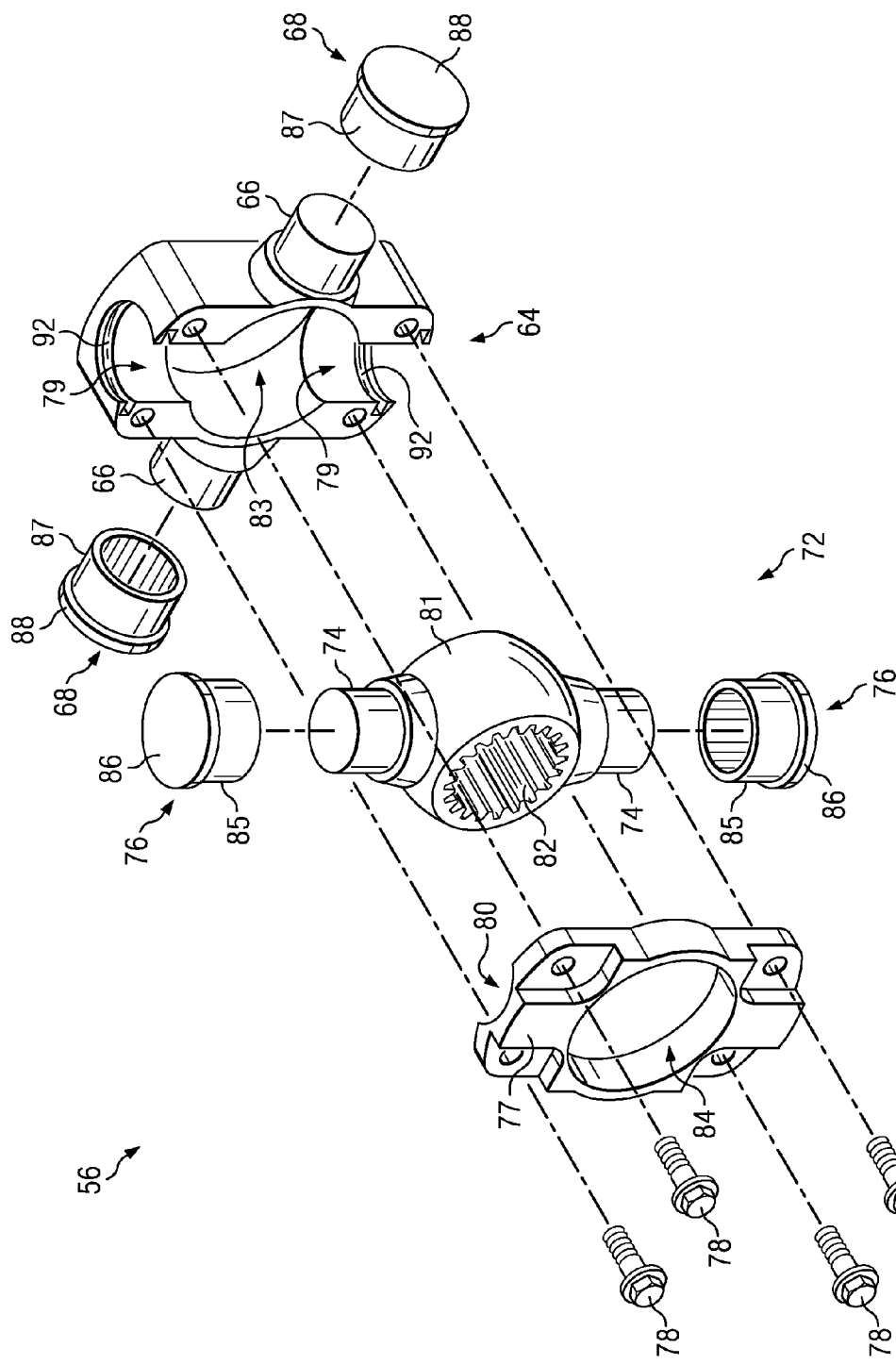
FIG. 8 is an exploded view depicting the cross member assembly of FIG. 7, in accordance with one embodiment.
Figure 9:
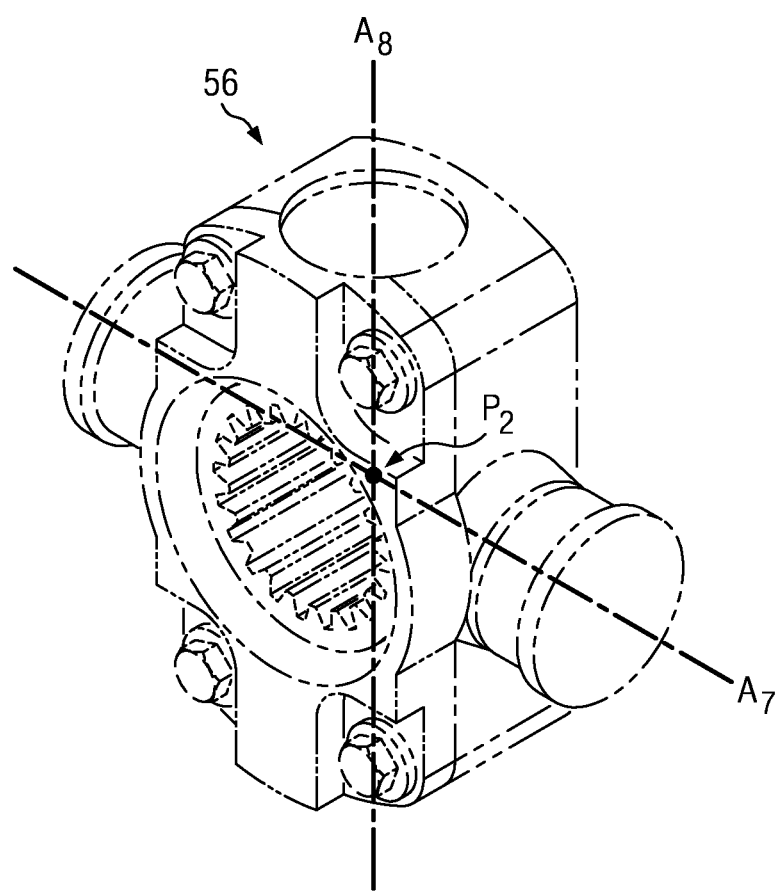
FIG. 9 is a perspective view depicting the cross member assembly of FIG. 7, wherein the cross member assembly is shown in dashed lines and a pair of pivot axis are shown in solid.

In one embodiment, as illustrated in FIG. 7, the cross member assembly 56 can include a first pivot member 64 that is pivotally coupled with the housing 28. As illustrated in FIG. 8, the first pivot member 64 can include a pair of first support arms 66 and a pair of first bearing caps 68 rotatably supported by the first support arms 66. The first bearing caps 68 can be sandwiched between the left and right housing portions 36, 38 such that the first pivot member 64 can pivot with respect to the housing 28 about an axis A7 (FIG. 7). In one embodiment, as illustrated in FIG. 7, the left housing portion 36 can define a pair of recesses 70 (one shown) and the right housing portion 38 can define a pair of recesses 71. Each recess (e.g., 70) of the left housing portion 36 can cooperate with one of the recesses 71 of the right housing portion 38 to accommodate one of the first bearing caps 68 when the left and right housing portions 36, 38 are coupled together. Although the left and right housing portions 36, 38 are shown to be coupled together with bolts 39, it will be appreciated that any of a variety of suitable alternative fastening arrangements can facilitate coupling of a left and a right housing portion, such as through welding, for example.

In one embodiment, as illustrated in FIG. 8, the first bearing caps 68 can be a 2-piece arrangement that includes a radial bearing 87 (e.g., a needle-type bearing) and a thrust bearing 88. As illustrated in FIG. 7, the left housing portion 36 can define a slot 90 along the circumference of each recess 70 and the right housing portion 38 can define a slot 91 along the circumference of each recess 71. When the left and right housing portions 36, 38 are coupled together, the thrust bearing 88 of each first bearing cap 68 can be supported within one of the pairs of corresponding slots 90, 91. The first bearing caps 68 can thus be secured with respect to the housing 28, without use of a separate fastening arrangement, such as a circlip, for example.

In one embodiment, as illustrated in FIG. 8, a second pivot member 72 can be pivotally coupled with the first pivot member 64. The second pivot member 72 can include a pair of second support arms 74 and a pair of second bearing caps 76 rotatably supported by the second support arms 74. The second bearing caps 76 can be sandwiched between the first pivot member 64 and a cover 77 such that the second pivot member 72 can pivot with respect to the first pivot member 64 about an axis A8 (FIG. 7). The cover 77 can be releasably coupled with the first pivot member 64 with bolts 78, or any of a variety of other suitable fastening arrangements (e.g., through welding). In one embodiment, as illustrated in FIG. 8, the first pivot member 64 can define a pair of grooves 79 and the cover 77 can define another pair of grooves 80 (one shown). The grooves 79 of the first pivot member 64 can cooperate with the grooves 80 of the cover 77 to accommodate the second bearing caps 76 when the cover 77 is coupled with the first pivot member 64.

The second bearing caps 76 can include a radial bearing 85 and a thrust bearing 86. As illustrated in FIG. 8, the second pivot member 72 can define a slot 92 along the circumference of each groove 79. When the cover 77 is coupled with the first pivot member 64, each thrust bearing 86 can be supported within one of the slots 92. The second bearing caps 76 can thus be secured with respect to the first pivot member 64 without use of a separate fastening arrangement, such as a circlip, for example. It will be appreciated that the slots 90, 91, 92 can ensure consistent and proper alignment of the first and second bearing caps 68, 76 and can also prevent the thrust bearings 86, 88 from inadvertently moving out of position during operation of the axle support assembly 27.

As illustrated in FIG. 8, the second pivot member 72 can include a ring portion 81 that can support the rear axle 29. In one embodiment, the ring portion 81 can include inner splines 82. The rear axle 29 can extend through the ring portion 81, and outer splines (not shown) of the rear axle 29 can engage the inner splines 82 of the ring portion 81 to couple the rear axle 29 and the second pivot member 72 together. The first pivot member 64 and the cover 77 can define respective openings 83, 84, as illustrated in FIG. 8. The left housing portion 36 can define a left opening 62 and the right housing portion 38 can define a right opening 63, as illustrated in FIGS. 6 and 7. The openings 62, 64, 83, 84 can be substantially aligned with one another other and the ring portion 81 to permit the rear axle 29 to pass through the cross member assembly 56 and the housing 28, as illustrated in FIGS. 1-5.

In one embodiment, the rear axle 29 can include a single, continuous axle shaft. In another embodiment, the rear axle 29 can include separate left and right axles (e.g., half shafts) that are independently coupled with the cross member assembly 56. It will be appreciated that, the rear axle 29 can be coupled with the cross member assembly 56 in any of a variety of suitable alternative arrangements, such as through welding, for example.

It will be appreciated that the cross member assembly 56 can be operable as a universal-type joint for the rear axle 29. For example, rotation of the housing 28 can rotate the cross member assembly 56 to facilitate rotation of the rear axle 29 about the rotation axis A6. During rotation of the rear axle 29, the first and second pivot members 64, 72 can pivot about their respective axes A7 and A8 to permit the rotation axis A6 of the rear axle 29 to diverge from the housing axis A5 (e.g., the rotation axis A6 to be angled with respect to the housing axis A5). The cross member assembly 56 can remain rotatably engaged with the rear axle 29 irrespective of the angle of the rotation axis A6 with respect to the housing axis A5. Motive power from the engine 41 can thus be transmitted from the housing 28 to the rear axle 29 for any position of the rear axle 29.

It will be appreciated that the thrust bearing 88 can axially support the first pivot member 64 with respect to the housing 28 and the thrust bearing 86 can axially support the second pivot member 72 with respect to the first pivot member 64. During operation of the vehicle 10 and as the cross member assembly 56 rotates, the thrust bearings 86, 88 can facilitate pivoting of the first and second pivot members 64, 72 while simultaneously transmitting forces from the rear axle 29 in the radial direction along the axis to the housing support 21 (via the housing 28). The cross member assembly 56 can thus provide more effective axle support than some conventional axle support arrangements (e.g., a conventional universal-type joint or a conventional continuous velocity-type joint).

It will be appreciated that the radial bearings 87 can radially support the first pivot member 64 with respect to the housing 28 and the radial bearings 85 can radially support the second pivot member 72 with respect to the first pivot member 64. During operation of the vehicle 10 and as the cross member 56 rotates, the radial bearings 85, 87 can facilitate pivoting of the first and second pivot members 62, 72 while simultaneously transmitting forces from the rear axle 29 in the axial direction along axis A6 to the housing support 21 (via the housing 28). The cross member 56 can thus provide more effective axle support than some conventional shaft support arrangements (e.g., a conventional universal-type joint or a conventional continuous velocity-type joint.

It will be appreciated that, without the stabilizing assembly 52, the cross member assembly 56 might facilitate additional movement of the rear axle 29 in fore and aft directions. As illustrated schematically in FIG. 9, the pivot axes A7 and A8 of the respective first and second pivot members 64, 72 can intersect at an imaginary point P2. During rotation of the rear axle 29, the first and second pivot members 64, 72 can about their respective axes A7 and A8 to pivot the rear axle 29 about the imaginary point P1. In such an arrangement, the rotational axis of the rear axle 29 is no longer constrained to pivoting in two dimensions (e.g., within plane P1 described above) but can pivot with respect to the housing 28 in three dimensions (e.g., upward, downward, forward, and aftward). In another embodiment, the stabilizing assembly 52 can be arranged in such a manner that the axis A9 (FIGS. 2 and 6) is substantially vertical such that the plane P1 (FIG. 2) is parallel to the ground. In this embodiment, the stabilizing assembly 52 can facilitate support of the rear axle 29 in such a manner that would permit steering of the vehicle 10 using the rear axle 29.

Figure 10:
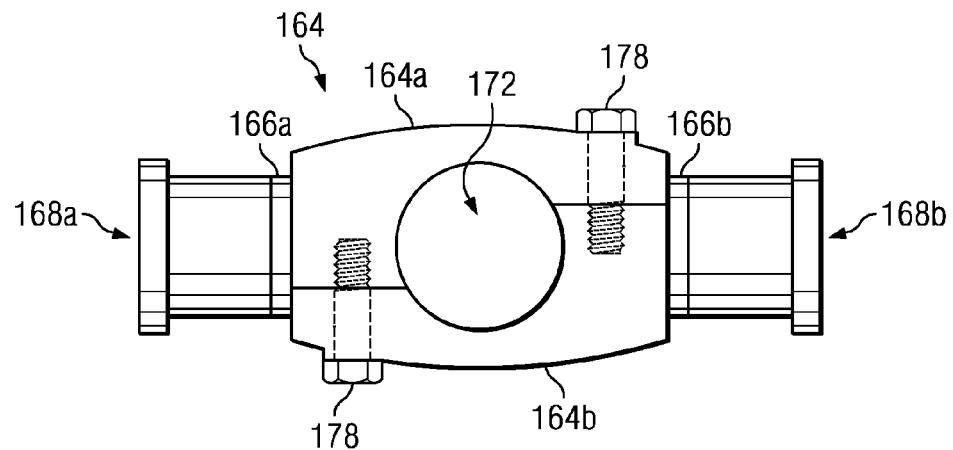
FIG. 10 is a top plan view depicting of a cross member assembly in accordance to another embodiment.
Figure 11:
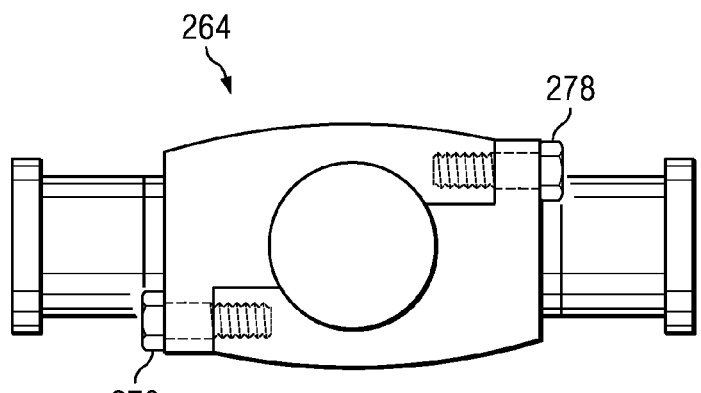
FIG. 11 is a top plan view depicting of a cross member assembly in accordance to yet another embodiment.
Figure 12:
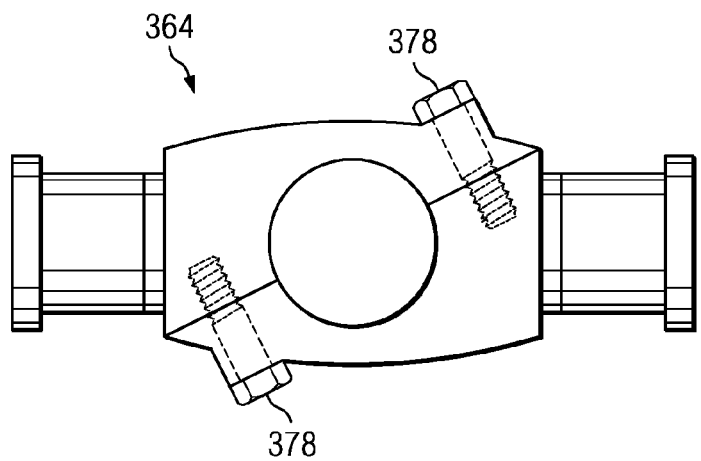
FIG. 12 is a top plan view depicting of a cross member assembly in accordance to yet another embodiment.

It will be appreciated that a first pivot member can be provided in any of a variety of suitable alternative arrangements that facilitate pivotal support of a second pivot member. In one alternative embodiment, as illustrated in FIG. 10, a first pivot member 164 can be provided that is similar in many respects to the first pivot member 64. The first pivot member 164, however, can include a pair of interchangeable body portions 164a, 164b. The interchangeable body portions 164a, 164b can be coupled together with bolts 178. A second pivot member 172 can be sandwiched between the pair of interchangeable body portions 164a, 164b to facilitate pivoting of the second pivot member 172 with respect to the first pivot member 164. Each of the interchangeable body portions 164a, 164b can include a respective first support arm 166a, 166b that rotatably supports a first bearing cap 168a, 168b. In other alternative embodiments, as illustrated in FIGS. 11 and 12, first pivot members 264, 364 can be provided that are similar in many respects to the first pivot member 164 illustrated in FIG. 10, but configured such that bolts 278, 378 are provided in different respective orientations from bolts 178.

Figure 13:
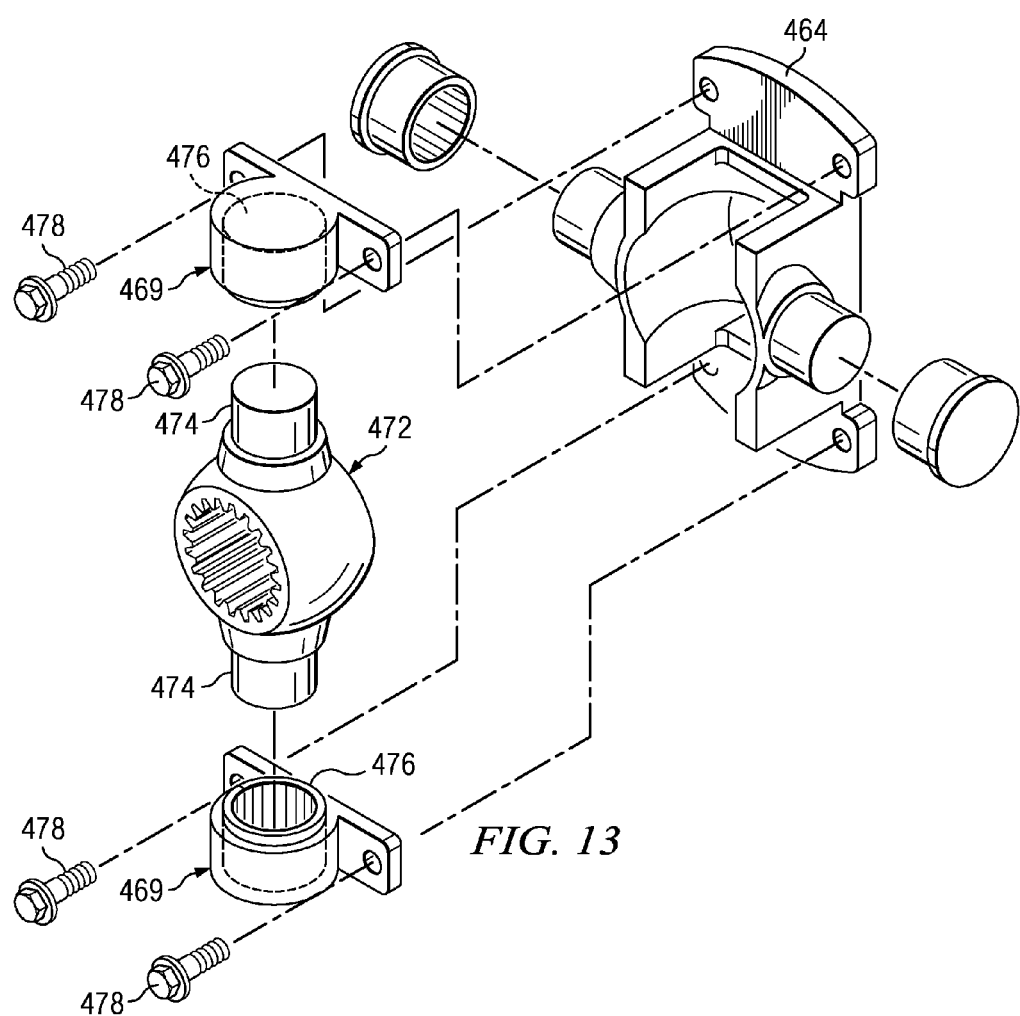
FIG. 13 is an exploded perspective view depicting a cross member assembly in accordance with yet another embodiment.
Figure 14:
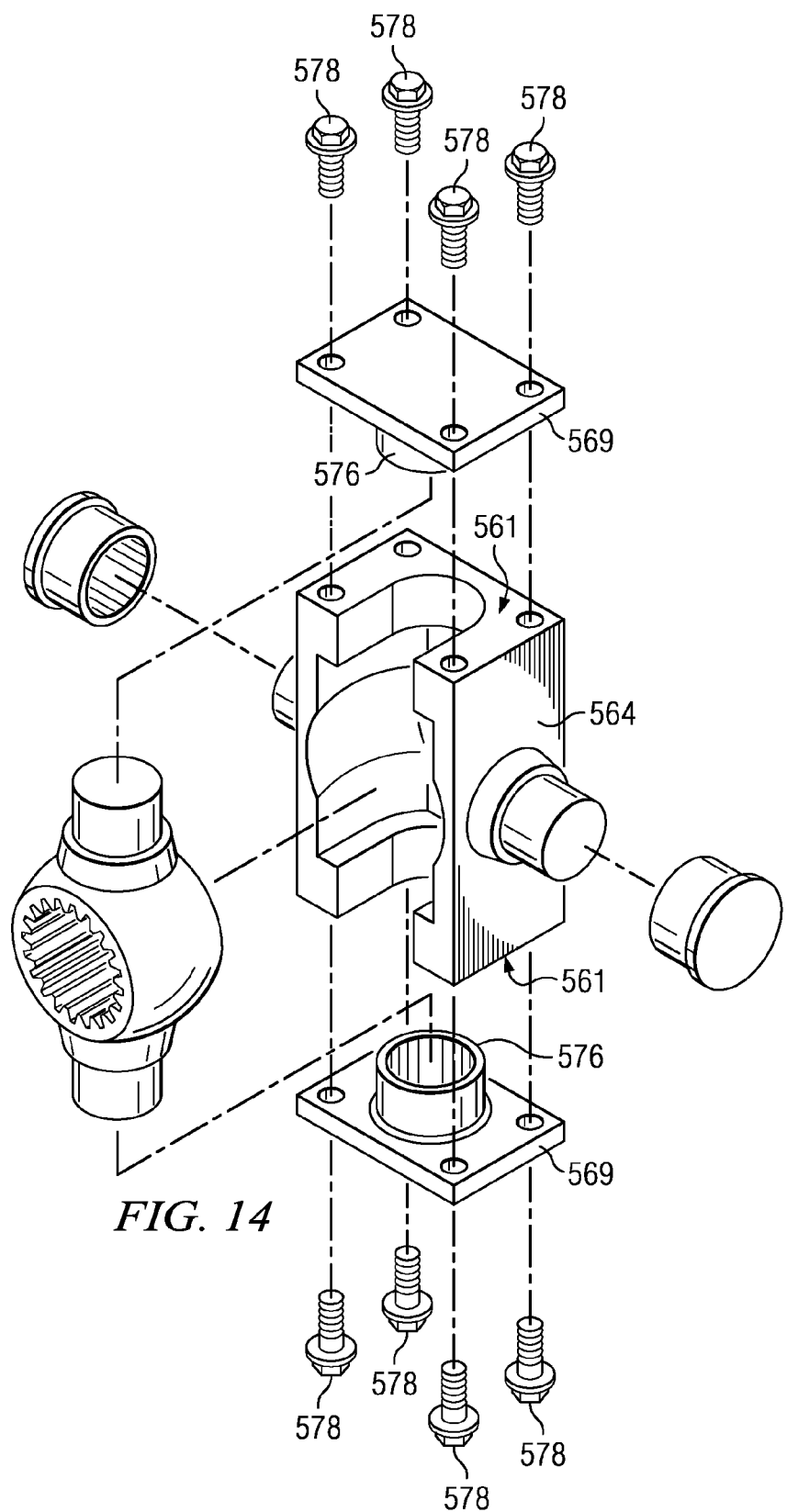
FIG. 14 is an exploded perspective view depicting a cross member assembly in accordance with yet another embodiment.

In yet another alternative embodiment, as illustrated in FIG. 13, a first pivot member 464 can include a pair of brackets 469. Each of the brackets 469 can be coupled with a second bearing cap 476 that can be rotatably coupled with second support arms 474 of a second pivot member 472. The brackets 469 can be coupled with the first pivot member 464 with bolts 478 to pivotally couple the second pivot member 472 to the first pivot member 464. In yet another alternative embodiment, as illustrated in FIG. 14, a first pivot member 564 can include a pair of brackets 569 that are similar in many respects to the brackets 469. For example, a bearing cap 576 can be coupled with each of the brackets 569. The brackets 569, however, can be configured such bolts 578 releasably couple the brackets 569 to opposite ends 561 of the first pivot member 564.

Figure 15:
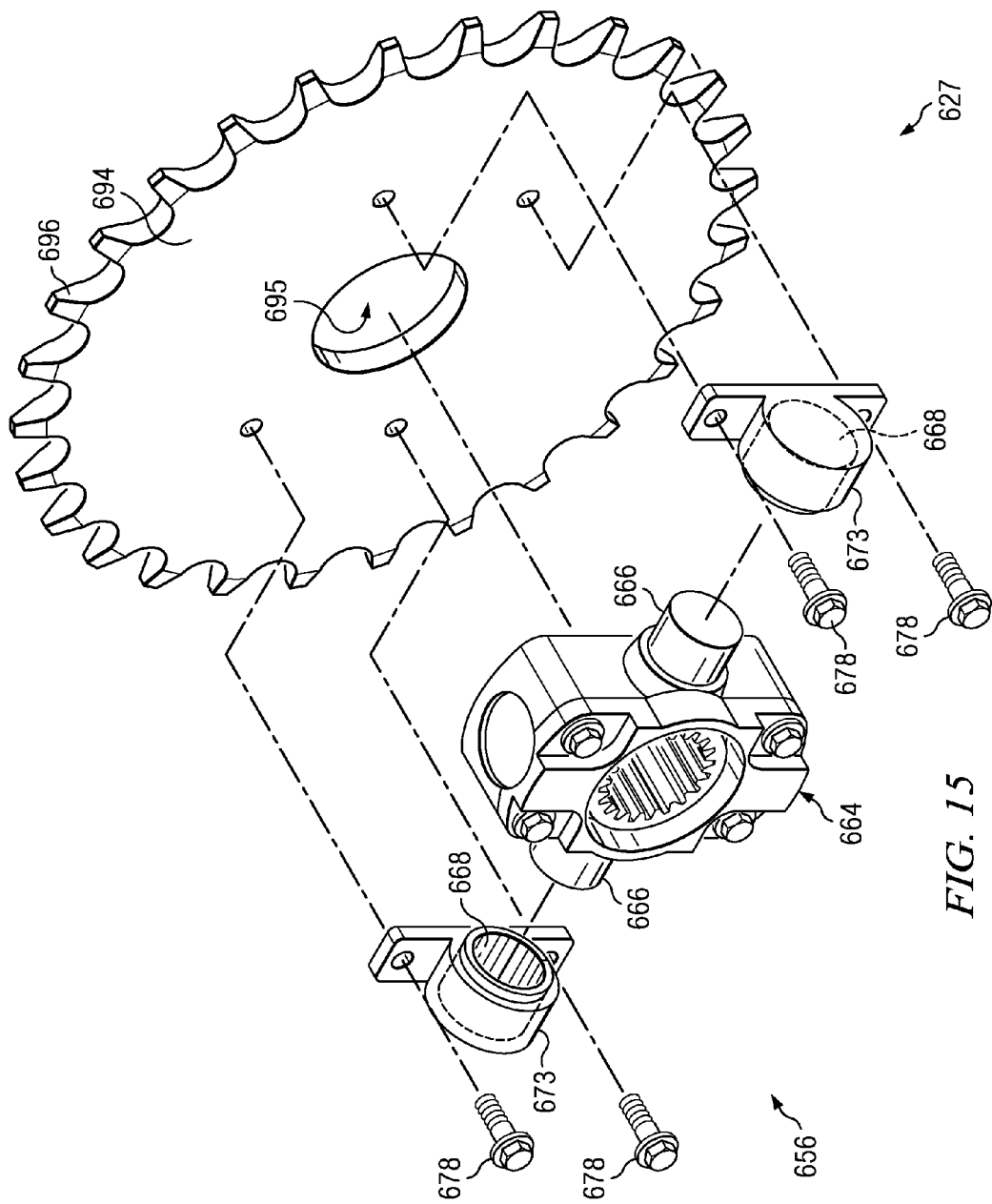
FIG. 15 is an exploded view depicting a cross member assembly in accordance with yet another embodiment.

Although the axle support assembly 27 is described above and shown to include a housing 28 that supports the cross member assembly 56, it will be appreciated that an axle support assembly can include any of a variety of suitable alternative driven member arrangements that can support a cross member assembly. For example, in one alternative embodiment, as illustrated in FIG. 15, an axle support assembly 627 can include a support plate 694. A cross member assembly 656 that is similar in many respects to the cross member assembly 56 can include a pair of brackets 673. Each of the brackets 673 can be coupled with a first bearing cap 668 that can be rotatably coupled with first support arms 666 of the first pivot member 664. Each of the brackets 673 can be releasably coupled to the support plate 694 with bolts 678. The support plate 694 can define an aperture 695 that allows passage of an axle shaft (not shown) through the support plate 694. An outer circumference of the support plate 694 can include sprockets 696. A flexible transmitter, such as a chain (e.g., 49 in FIG. 1) or a cogged belt, can couple the support plate 694 to an engine's driveshaft. The driveshaft can rotate the support plate 694 via the flexible transmitter to drive wheels (e.g., 26) associated with the axle shaft.

It will be appreciated that although the axle support assembly 27 is described with respect to the rear axle 29, an axle support assembly can be additionally or alternatively provided for other axles of a vehicle, such as a front axle, for example. It will also be appreciated that the cross member assembly 56 can be utilized to support a shaft in any of a variety of non-vehicle applications.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicular swing arm assembly comprising:
    a swing member configured for pivotal attachment to a frame of a vehicle;
    an axle support assembly comprising:
        a driven member rotatably coupled with the swing member and rotatable about a drive axis; and
        a cross member assembly comprising:
            a first pivot member pivotally coupled with the driven member and pivotable with respect to the driven member about a first axis; and
            a second pivot member pivotally coupled with the first pivot member and pivotable with respect to the first pivot member about a second axis; and
    an axle coupled with one of the first and second pivot members and rotatable about a third axis;
    wherein rotation of the driven member about the drive axis facilitates rotation of the axle about the third axis.

2. The vehicular swing arm assembly of claim 1 wherein the driven member comprises a housing defining an inner chamber.

3. The vehicular swing arm assembly of claim 2 wherein the housing comprises a right housing portion and a left housing portion.

4. The vehicular swing arm assembly of claim 3 wherein the axle support assembly further comprises a driven sprocket that is coupled with one of the left housing portion and the right housing portion through splined engagement.

5. The vehicular swing arm assembly of claim 3 wherein the first pivot member is at least partially disposed within the inner chamber and is coupled with at least one of the left housing portion and the right housing portion.

6. The vehicular swing arm assembly of claim 1 wherein the first pivot member comprises a pair of first support arms that are pivotally coupled with the housing and the second pivot member comprises a pair of second support arms that are pivotally coupled with the first pivot member.

7. The vehicular swing arm assembly of claim 6 wherein the cross member assembly further comprises a pair of first bearing caps and a pair of second bearing caps, each of the first bearing caps being rotatably supported by one of the first support arms and each of the second bearing caps being rotatably supported by one of the second support arms.

8. The vehicular swing arm assembly of claim 7 wherein the first bearing caps and the second bearing caps each comprise a radial bearing and a thrust bearing.

9. The vehicular swing arm assembly of claim 1 wherein the first axis and the second axis are perpendicular to one another.

10. The vehicular swing arm assembly of claim 1 wherein at least one of the first pivot member and the second pivot member comprises a ring portion that is coupled with the axle through splined engagement.

11. The vehicular swing arm assembly of claim 1 wherein the first and second pivot members facilitate pivoting of the axle about a fourth axis.

12. The vehicular swing arm assembly of claim 1 wherein the first axis and the second axis intersect at an imaginary point and the first and second pivot members facilitate pivoting of the axle about the imaginary point.

13. A vehicle comprising:
a frame;
a swing member pivotally attached to the frame;
an axle support assembly comprising:
  a driven member rotatably coupled with the swing member; and
  a cross member assembly comprising:
    a first pivot member pivotally coupled with the driven member and pivotable with respect to the driven member about a first axis; and
    a second pivot member pivotally coupled with the first pivot member and pivotable with respect to the first pivot member about a second axis; and
an axle coupled with one of the first and second pivot members and rotatable about a third axis;
wherein rotation of the housing about the housing axis facilitates rotation of the axle about the third axis.

14. The vehicle of claim 13 wherein the first pivot member comprises a pair of first support arms that are pivotally coupled with the driven member and the second pivot member comprises a pair of second support arms that are pivotally coupled with the first pivot member.

15. The vehicle of claim 14 wherein the cross member assembly further comprises a pair of first bearing caps and a pair of second bearing caps, each of the first bearing caps being rotatably supported by one of the first support arms and each of the second bearing caps being rotatably supported by one of the second support arms.

16. The vehicle of claim 15 wherein the first bearing caps and the second bearing caps each comprise a radial bearing and a thrust bearing.

17. The vehicle of claim 16 wherein the first pivot member defines first slots, the driven member defines second slots, the thrust bearings of the first bearing caps are supported with respect to the driven member by the second slots, and the thrust bearings of the second bearing caps are supported with respect to the first pivot member by the first slots.

18. The vehicle of claim 13 further comprising a stabilizing assembly pivotally coupled with the housing and pivotal about a fourth axis, the stabilizing assembly comprising a left support and a right support that cooperate to rotatably support the axle, wherein the cross member assembly facilitates pivoting of the axle about the forth axis.

19. A shaft assembly comprising:
a shaft; and
a cross member assembly comprising:
  a first pivot member configured for pivoting with respect to a driven member and pivotable about a first axis; and
  a second pivot member pivotally coupled with the first pivot member and pivotable with respect to the first pivot member about a second axis; and
wherein the shaft is coupled with the second pivot member, and the first pivot member and the second pivot member cooperate to facilitate pivoting of the shaft about a third axis.

20. The shaft assembly of claim 19 further comprising a housing that comprises a left housing portion and a right housing portion that cooperate to define an inner chamber, wherein the first pivot member is at least partially disposed within the inner chamber and is pivotally coupled with at least one of the left housing portion and the right housing portion.

\* \* \* \* \*